A. T. HOLMES.
STEERING DEVICE FOR CULTIVATORS.
APPLICATION FILED JULY 31, 1913.

1,093,421.

Patented Apr. 14, 1914.

WITNESSES
Samuel E. Wade.
Walton Harrison.

INVENTOR
Asa T. Holmes
BY Munn & Co.
ATTORNEYS

UNITED STATES PATENT OFFICE.

ASA T. HOLMES, OF ST. JOHN, WASHINGTON.

STEERING DEVICE FOR CULTIVATORS.

1,093,421. Specification of Letters Patent. Patented Apr. 14, 1914.

Application filed July 31, 1913. Serial No. 782,221.

*To all whom it may concern:*

Be it known that I, ASA T. HOLMES, a citizen of the United States, and a resident of St. John, in the county of Whitman and State of Washington, have invented certain new and useful Improvements in Steering Devices for Cultivators, of which the following is a specification.

My invention relates to steering devices for cultivators, the more particular purpose of my invention being to enable the operator to cause the cultivator to make a comparatively short turn, thus occupying a minimum of room for the purpose and also enabling the turning movement to be easily executed.

My invention admits of general use and may be employed in connection with cultivators of many different types but for the sake of simplicity, I show it as applied to an ordinary hand cultivator.

Reference is made to the accompanying drawing, forming a part of this application in which like letters indicate like parts.

Figure 1:
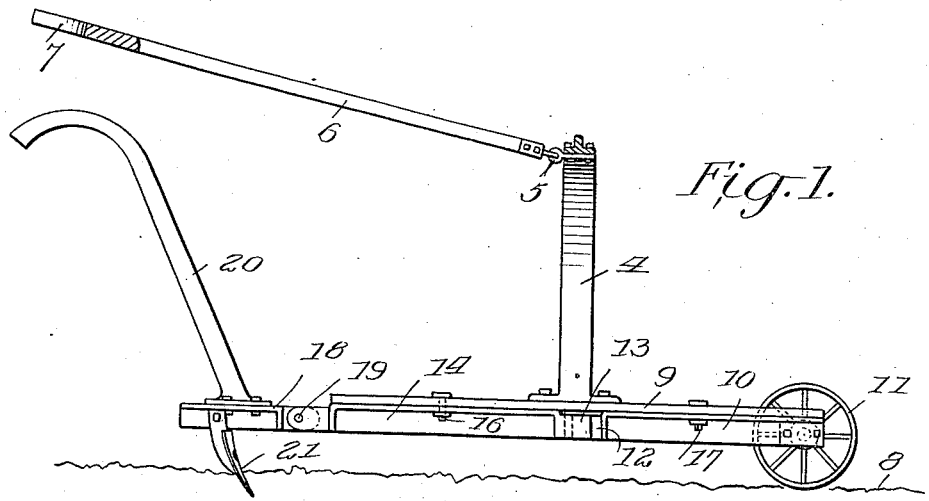
Figure 2:
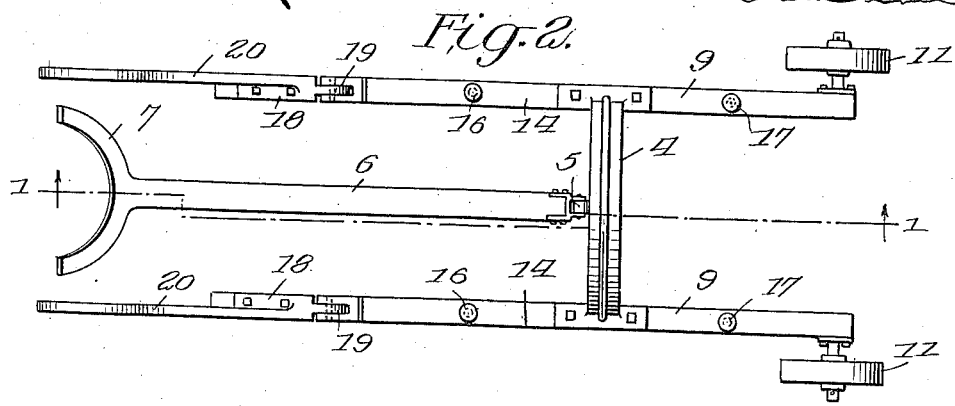
Figure 3:
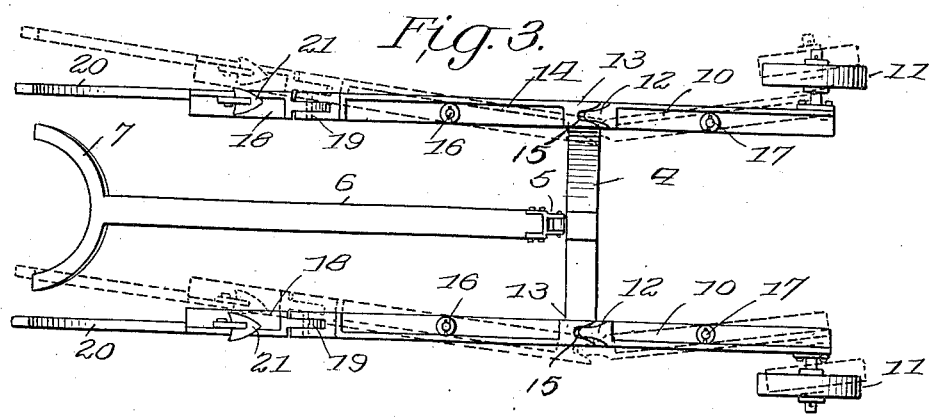

Figure 1 is a vertical longitudinal section through the cultivator, and is taken on the line 1—1 of Fig. 2, looking in the direction of the arrow. Fig. 2 is a plan view of the cultivator showing the same in its normal position. Fig. 3 is a plan view of the cultivator showing the same in full lines as occupying its normal position, and in dotted lines as turning.

An arch is shown at 4 and connected with this arch by a pivot joint 5 is a breast lever 6. This breast lever carries a breast plate 7, the latter being adapted to engage the breast of the operator as he pushes the cultivator along over the ground which is shown at 8. The arch 4 is supported upon a pair of parallel beams 9 and is rigid relatively to the same. Pivoted below the beams 9 are two forward pivot bars 10 each carrying a ground wheel 11. Each bar 10 is provided at its rear end with a substantially V-shaped bearing member 12 which fits into a mating bearing member 13 carried by a lever 14. This lever is supported upon the under side of the beams 9 by a pivot pin 16. Each lever 14 is thus in operative relation to its respective bar 10 so that when the lever is swung say in a clockwise direction upon its pivot pin 16 as a center, the pivot bar is rocked in a contraclockwise direction. Each pivot bar is mounted in position by a pivot pin 17. Each lever 14 carries a swinging frame 18 which is secured to it by a bearing 19 and may be moved in a substantially vertical plane. Each frame 18 carries a plow handle 20 and a plow point 21. The operator by raising or lowering the plow handles 20 may elevate or depress the plow points 21 and thus regulate the depth of the furrows made by the plow points. The operator by swinging either plow handle 20 and thus shifting the angular position of the corresponding lever 14, may cause through joint 12, 13 the corresponding pivot 10 to turn upon its pivot pin 17, thus shifting the vertical plane of the wheel 11. The two wheels 11 are thus rendered independent in their action to the extent that the operator may turn either one or both of them to any desired extent.

By virtue of the operative connection between the levers 14 and their pivot bars 10, the entire under portion of the cultivator may be caused to virtually bend so that the turning of the machine at the end of a row or other suitable point is greatly facilitated.

It will be noted that the steering of the cultivator in accordance with the plan above described, does not interfere in the slightest degree with the raising and lowering of the plow point, in fact the operator can raise or lower either plow point and at the same time cause the machine to steer in a circular path or in a straight path as desired.

I do not limit myself to the precise construction shown, as variations may be made therein without departing from the spirit of my invention.

I claim:

1. In a steering device for cultivators, the combination of an arch, a breast lever connected therewith, a pair of beams rigidly connected with said arch, a bar pivotally connected with each of said beams, mechanism connected with said beams and controllable at the will of the operator for tilling the soil, said mechanism being connected with said bar, for the purpose of turning the latter relatively to said arch.

2. In a steering mechanism for cultivators, the combination of a frame, pivot bars connected therewith and adapted to swing relatively thereto, levers connected with said pivot bars for actuating the same and means controllable at the will of the operator for actuating said levers.

3. In a steering mechanism for cultivators, the combination of a pair of beams, an arch mounted rigidly upon said beams, a pair of bars pivotally connected with said beams and located upon the under sides thereof, each bar being provided with a bearing member, a pair of levers pivotally mounted upon the under side of said beams and provided with a bearing portion mating said bearing portion of a bar, a member pivotally connected with each lever and adapted to swing in a vertical plane, a plow point carried by said member for engaging the soil and a plow handle rigidly connected with said member for shifting the latter relatively to the lever with which it is associated.

4. A device of the character described, comprising a frame, a bar pivotally mounted upon the under side thereof and provided with a wheel for engaging the ground, said bar being further provided with a substantially V-shaped bearing member, a lever pivotally mounted upon the under side of said frame and provided with a mating bearing member engaging said bearing member of said bar, a plow point for engaging the ground, and a supporting member carrying the said plow point and pivotally connected to said lever.

ASA T. HOLMES.

Witnesses:
EDNA MUNDURLER,
ALMA SCHUSTER.

Copies of this patent may be obtained for five cents each, by addressing the "Commissioner of Patents, Washington, D. C."